United States Patent [19]

Sawaki

[11] Patent Number: 5,263,141
[45] Date of Patent: Nov. 16, 1993

[54] MICROPROCESSOR WITH AN EXCLUSIVE ADDRESS TERMINAL FOR SELECTING AT LEAST ONE PART OF A PERIPHERAL DEVICE

[75] Inventor: Yukichi Sawaki, Nagoya, Japan

[73] Assignee: Brother Kogyo Kabushiki Kaisha, Aichi, Japan

[21] Appl. No.: 46,907

[22] Filed: Apr. 15, 1993

Related U.S. Application Data

[63] Continuation of Ser. No. 470,734, Jan. 26, 1990, abandoned.

[30] Foreign Application Priority Data

Jan. 31, 1989 [JP] Japan .................. 1-21762

[51] Int. Cl.$^5$ .............................................. G06F 13/10
[52] U.S. Cl. .................................. 395/425; 395/800; 364/232.8; 364/231.5; 364/240.5; 364/240.7; 364/241.9; 364/243.6; 364/245.31; 364/DIG. 2; 364/927.93; 364/927.94
[58] Field of Search .................. 395/325, 425, 800

[56] References Cited

U.S. PATENT DOCUMENTS

| | | | |
|---|---|---|---|
| 4,393,464 | 7/1983 | Knapp et al. | 395/800 |
| 4,443,864 | 4/1984 | McElroy | 395/325 |
| 4,445,170 | 4/1984 | Hughes et al. | 395/400 |
| 4,468,737 | 8/1984 | Bowen | 395/275 |
| 4,503,491 | 3/1985 | Lushtak et al. | 395/400 |
| 4,543,629 | 9/1985 | Grey et al. | 395/325 |
| 4,649,471 | 3/1987 | Briggs et al. | 395/325 |
| 4,694,394 | 9/1987 | Costantini | 395/800 |
| 4,802,119 | 1/1989 | Heene et al. | 395/400 |
| 4,839,795 | 6/1989 | Iwaksaki | 395/275 |
| 4,845,657 | 7/1989 | Yokota et al. | 395/275 |
| 5,056,009 | 10/1991 | Mizuta | 395/425 |
| 5,067,077 | 11/1991 | Wakimoto et al. | 395/400 |

OTHER PUBLICATIONS

Liu et al; "Microcomputer Systems: The 8086/8088 Family Architecture, Programming, and Design"; Prentice-Hall 1984, 1986 pp. 25-27, 308-333.

*Primary Examiner*—Parshotam S. Lall
*Assistant Examiner*—Krisna Lim
*Attorney, Agent, or Firm*—Oliff & Berridge

[57] ABSTRACT

A digital electronic circuit device includes a CPU provided with multiplexed address/data terminals and exclusive address terminals, an expansion port provided with data terminals and exclusive address terminals, a multiplexed address/data bus connecting the multiplexed address/data terminals with the data terminals and an address bus connecting the address terminals of the CPU with the address terminals of the expansion port. If a program for the CPU is likely to contain many bugs, a detachable external ROM for storing the program and an address latch are connected with the multiplexed address/data bus. The address latch receives address signals from the multiplexed address/data bus, temporarily stores these signals and addresses the external ROM.

12 Claims, 4 Drawing Sheets

MICROPROCESSOR WITH AN EXCLUSIVE ADDRESS TERMINAL FOR SELECTING AT LEAST ONE PART OF A PERIPHERAL DEVICE

This is a continuation of application Ser. No. 07/470,734 filed Jan. 26, 1990, now abandoned.

FIELD OF THE INVENTION

The present invention relates to a digital electronic circuit device with a CPU and, in particular, to a digital electronic circuit device provided with a CPU having multiplexed address/data terminals which are capable of outputting address signals and data signals by means of time-sharing.

BACKGROUND OF THE INVENTION

Conventionally, in order to supply data and address signals from a CPU to a peripheral circuit, there are provided an external address latch and a multiplexed address/data bus connected with the CPU. The multiplexed address/data bus is used for transferring both data signals and lower address signals in a time-sharing manner with the address latch temporarily storing the lower address signals. Thus, a peripheral circuit receives upper address signals directly supplied from the CPU and lower address signals from the address latch.

During program development, a detachable external ROM is used as a program memory for a CPU when a program is likely to contain many bugs. After the program is finalized, the external ROM is connected in the conventional circuit device as described above.

A digital electronic circuit device first proposed by the inventor of the present invention (who was under an obligation to assign the subject matter of FIGS. 3 and 4 to the assignee of the present invention) is constructed as shown in FIG. 3. A multiplexed address/data bus 8 is connected between a peripheral element 3 and multiplexed address/data terminals A0~A7, D0~D7 of a CPU 1. An address bus 7 is connected between an address terminal A13 of the CPU 1, exclusively used for an address signal, and a chip-select terminal CS the peripheral element 3. An address latch 4 together with a detachable external ROM 2 (Electrically Programmable ROM) are connected to the multiplexed address/data bus 8, and an output-enable terminal OE of the address latch 4 is connected to the address terminal A13 of the CPU 1 through the address bus 7. After the address latch 4 has held lower address signals, given from the CPU 1 through the multiplexed address/data bus 8, for a required period, the latch 4 outputs the lower address signals to the external ROM 2 through an address bus 9. Latch 4 also outputs a part of the lower address signals to address terminals A0, A1 of the peripheral element 3, through an address bus 11. The external ROM 2 outputs its stored data signals to the multiplexed address/data bus 8, through a data bus 10 when the ROM 2 receives the lower address signals, outputted from the address latch 4 through the address bus 9, and upper address signals, outputted from exclusive address terminals A8~A12 of the CPU 1 through an address bus 6.

When a program for the CPU 1 is debugged, the external ROM 2 may be replaced by a masked ROM internal to a CPU, in which the revised program is written in a process of producing the CPU. The external ROM 2 can be removed without affecting other circuits. However, it is impossible to remove address latch 4 because the address bus 11, connected with the address terminals A0, A1 of the peripheral element 3, is connected with the multi-plexed address/data terminals A0~A7, D0~D7, through the address latch 4 and the multiplexed address/data bus 8.

FIG. 4 shows a digital electronic circuit device wherein the CPU 1 shown in FIG. 3 is replaced with a CPU 21 equipped inside with a masked ROM 22 and the external ROM 2 has been removed. The address latch 4 remains only for holding address signals to be supplied to the peripheral element 3. Consequently, it is difficult to decrease the number of circuit elements and the number of assembling processes, so that the digital electronic circuit device may not be produced at a lower cost.

SUMMARY OF THE INVENTION

Accordingly, it is an object of the present invention to provide a digital electronic circuit device capable of being produced with the least number of circuit elements and at greatly reduced cost.

In order to accomplish the above-mentioned object, the digital electronic circuit device according to the present invention comprises: central processing unit having plural terminals including a multiplexed terminal capable of outputting an address signal and a data signal in a time-sharing manner; peripheral device for receiving at least one of the address signal and data signal from the central processing means the peripheral, unit having a data terminal and an input terminal, an operational state of the peripheral device being changed in response to a signal inputted through the input terminal; first bus unit for connecting the multiplexed terminal with the data terminal; and second means for connecting the input terminal with a terminal of the plural terminals of the central processing unit other than the multiplexed terminal.

In the digital electronic circuit device having the foregoing construction, the second bus unit transfers a signal from a terminal of the plural terminals, other than the multiplexed terminal, directly to the input terminal of the peripheral device. The peripheral device is enabled and set to a required operational state by the signal supplied to the input terminal.

An external memory and an address latch are used while a program for the central processing means is likely to contain many bugs. The address latch temporarily stores an address signal supplied from the multiplexed terminal through the first bus unit. External memory, storing the program, is addressed based on the address signal stored in the address latch. Data signals or command signals from the external memory are supplied to the central processing unit, or the peripheral device, through the first bus unit.

After a program is debugged, the central processing unit may be fabricated with an internal masked memory storing the revised program. In this case, both the external memory and the address latch can be removed without affecting the peripheral device. Thus, the number of circuit elements can be decreased, making it possible to produce a digital electronic circuit device at a lower cost.

BRIEF DESCRIPTION OF THE DRAWINGS

The above and other objects, features and advantages of the present invention will become more apparent from reading the following description of the preferred embodiments taken in connection with the accompanying drawings in which.

DETAILED DESCRIPTION OF THE PREFERRED EMBODIMENTS

Referring to the accompanying drawings, an embodiment of the digital electronic circuit device according to the present invention will now be explained with reference to FIGS. 1 and 2.

Figure 1:
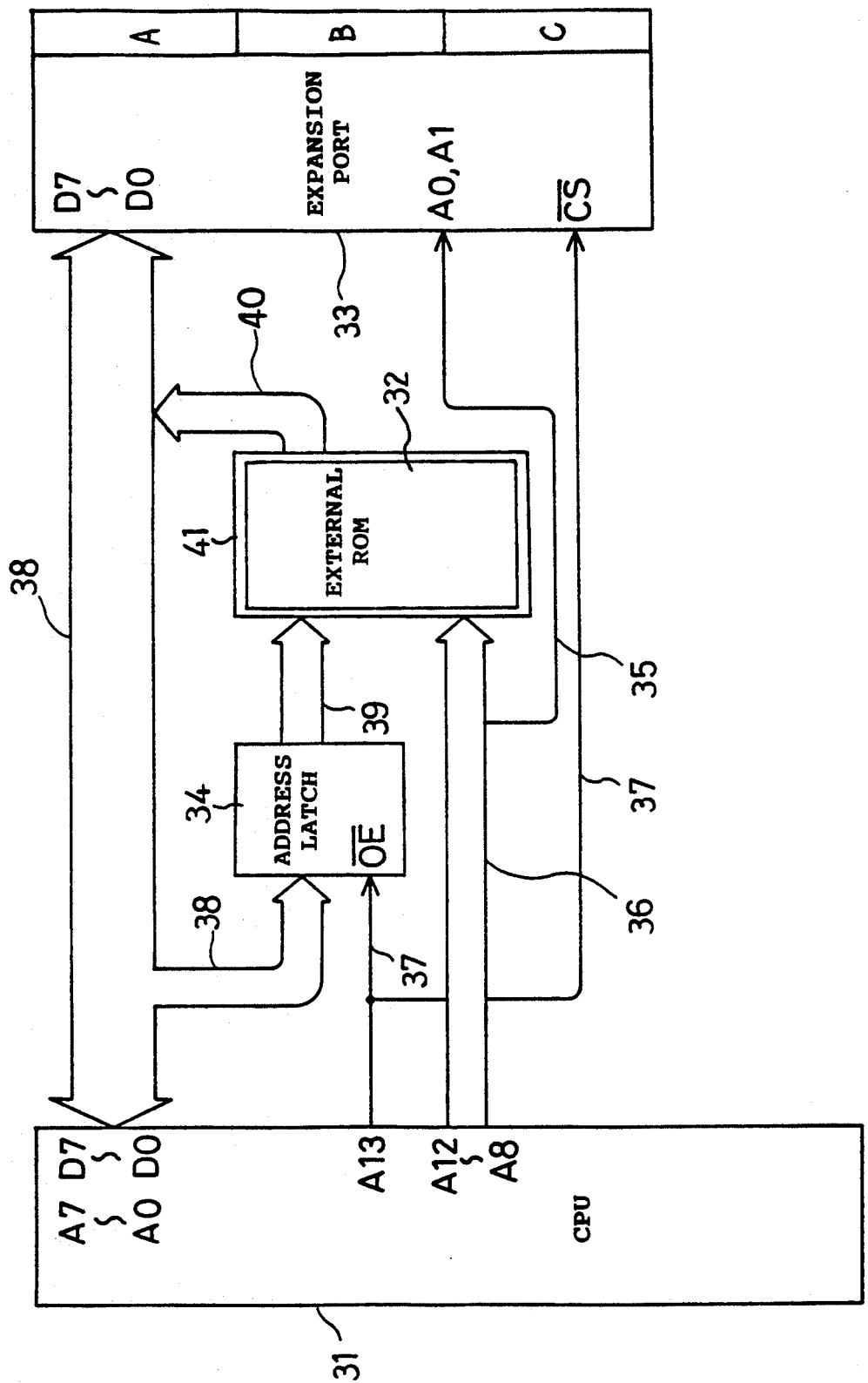
FIG. 1 is a block diagram showing a construction of an embodiment of a digital electronic circuit device according to the present invention.

As shown in FIG. 1, CPU 31 (central processing unit) is provided with multiplexed address/data terminals A0~A7, D0~D7 capable of outputting or receiving 8 bit lower address signals and 8 bit data signals in a time-sharing manner. Further the CPU 31 has exclusive address terminals A8~A12 for outputting 5 bit upper address signals and an exclusive address terminal A13 for outputting a one bit address signal. An expansion port 33 having three ports A, B, C is equipped as a peripheral element. The expansion port 33 is provided with exclusive address terminals A0, A1 for receiving 2 bit address signals, a chip-select terminal CS, and data terminals D0~D7 for outputting or receiving 8 bit signals. A multiplexed address/data bus 38 is connected between the multiplexed address/data terminals A0-~A7, D0~D7 of the CPU 31 and the data terminals D0~D7 of the expansion port 33. An address bus 37 is connected between the address terminal A13 of the CPU 31 and the chip-select terminal CS of the expansion port 33.

When a program for the CPU 31 is likely to contain many bugs an external ROM 32 and an address latch 34 are used as shown in FIG. 1. The external ROM 32 is detachably connected to the multiplexed address/data bus 38 through a memory connector 41. The address bus 37 connects the address terminal A13 of the CPU 31 with an output-enable terminal OE of the address latch 34. The address latch 34 is adapted to output the lower address signals to the external ROM 32 through an address bus 39, after the address latch 34 has held the lower address signals, supplied through the multiplexed address/data bus 38, for a required period. The external ROM 32 outputs desired data signals to the multiplexed address/data bus 38 through a data bus 40 when receiving the lower address signals, outputted from the address latch 34 through the address bus 39, and the upper address signals, outputted from the address terminals A8~A12 of the CPU 31 through an address bus 36.

An address bus 35 connects two terminals A8, A9 of the address terminals A8~A12 of the CPU 31 with the address terminals A0, A1 of the expansion port 33. Further, in this embodiment, addresses ∅~1FFF, presented by 14 bit address signals outputted from the multiplexed address/data terminals A0~A7, D0~D7 and the address terminals A8~A13, are allotted to the external ROM 32. Four addresses, 20XX, 21XX, 22XX and 23XX, presented by the 14 bit address signals are allotted to three ports A, B, C and a control word register (not shown) equipped inside the expansion port 33, respectively, wherein X presents an arbitrary number between ∅ and F in hexadecimal. If address signals presenting address 20XX are outputted from the address terminals A0~A13 and the address terminals A0, A1 of the expansion port 33 receive 2 bit signals of "00" from the address terminals A8, A9, through the address bus 35, then the port A is selected among three ports A, B, C of the expansion port 33. Likewise, selection of port B or C is performed by 2 bit signals of "10" or "01" inputted to the address terminals A0, A1 of the expansion port 33. In addition, the control word register is selected by 2 bit signals of "11, inputted to the address terminals A0, A1, to store a command for setting an operational state of three ports A, B, C to either an input state or an output state.

The construction of the circuit device shown in FIG. 1 makes it convenient to replace the external ROM 32 by another external ROM storing a revised program for the CPU 31. When a program for the CPU 31 has been completed with few bugs, as shown in FIG. 2, the CPU 31 is replaced with a CPU 51 equipped internally with a masked ROM 52 storing the completed program. In addition, since the external ROM 32 is substituted by the masked ROM 52, the external ROM 32 and the memory connector 41 are removed. The address latch 34 is also removed because no output terminal of the address latch 34 is connected with the expansion port 33.

Figure 2:
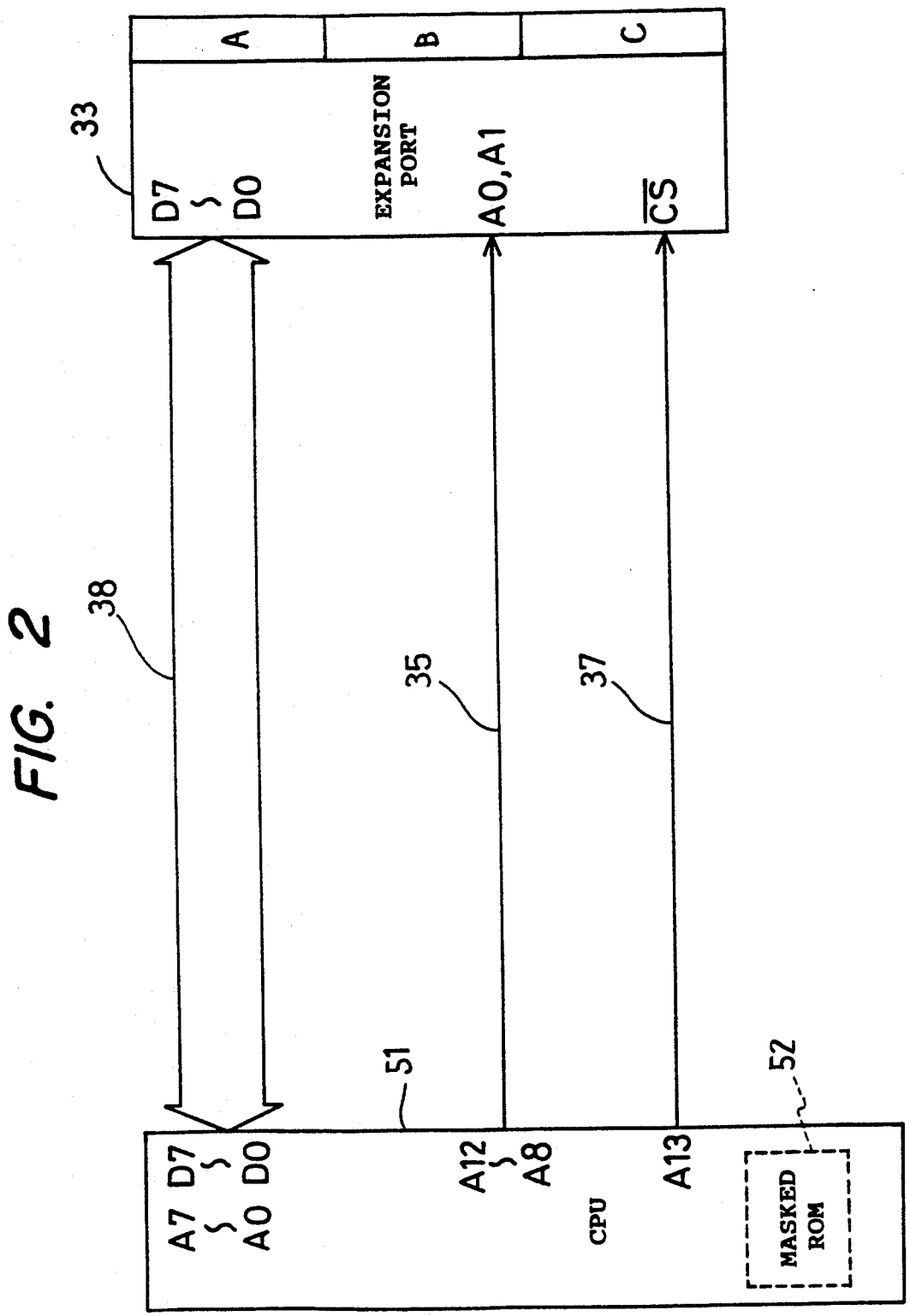
FIG. 2 is a block diagram showing a digital electronic circuit device which has an external ROM and an address latch removed from the digital electronic circuit device shown in FIG. 1.
Figure 3:
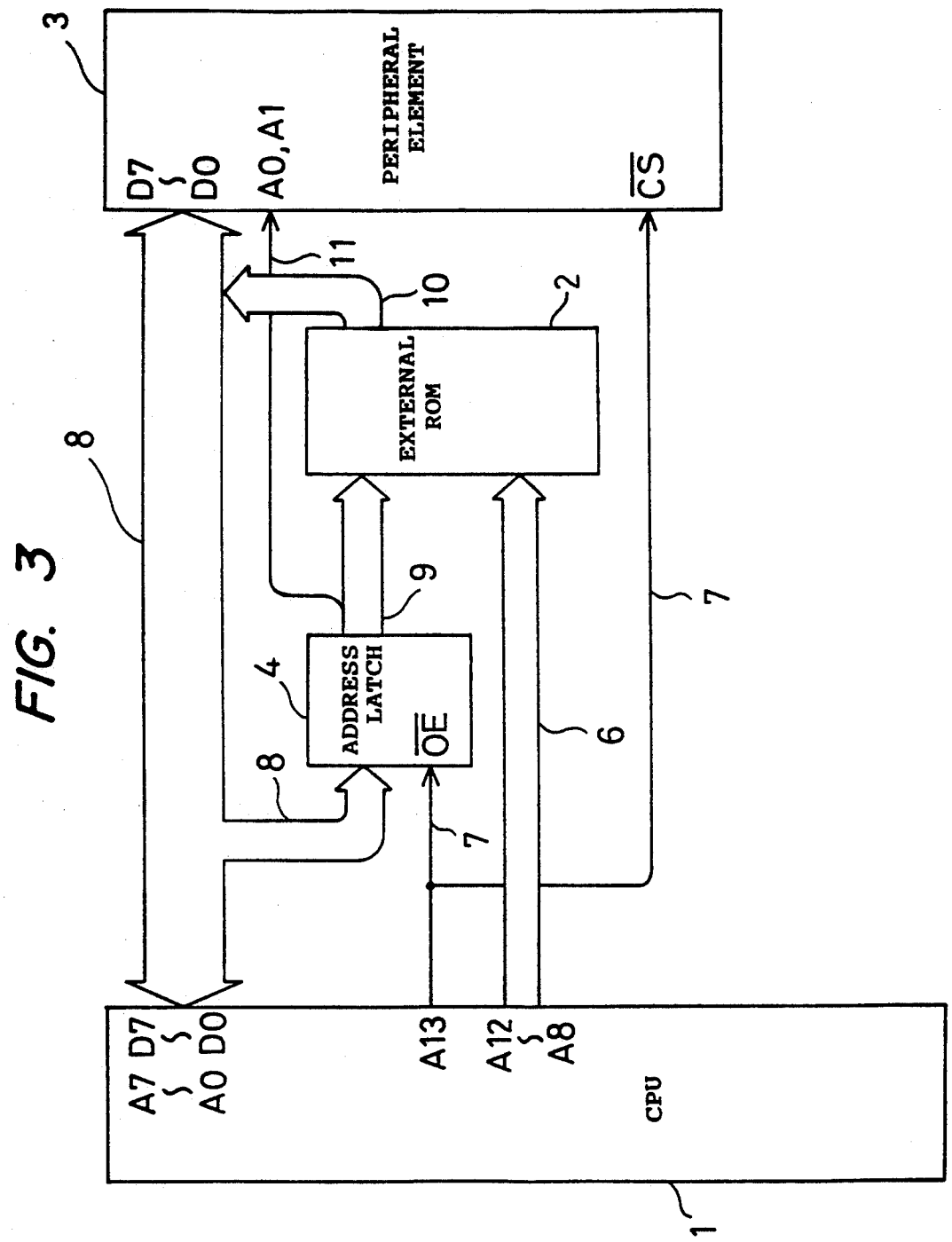
FIG. 3 is a block diagram showing a construction of a digital electronic circuit device proposed prior to the present invention.
Figure 4:
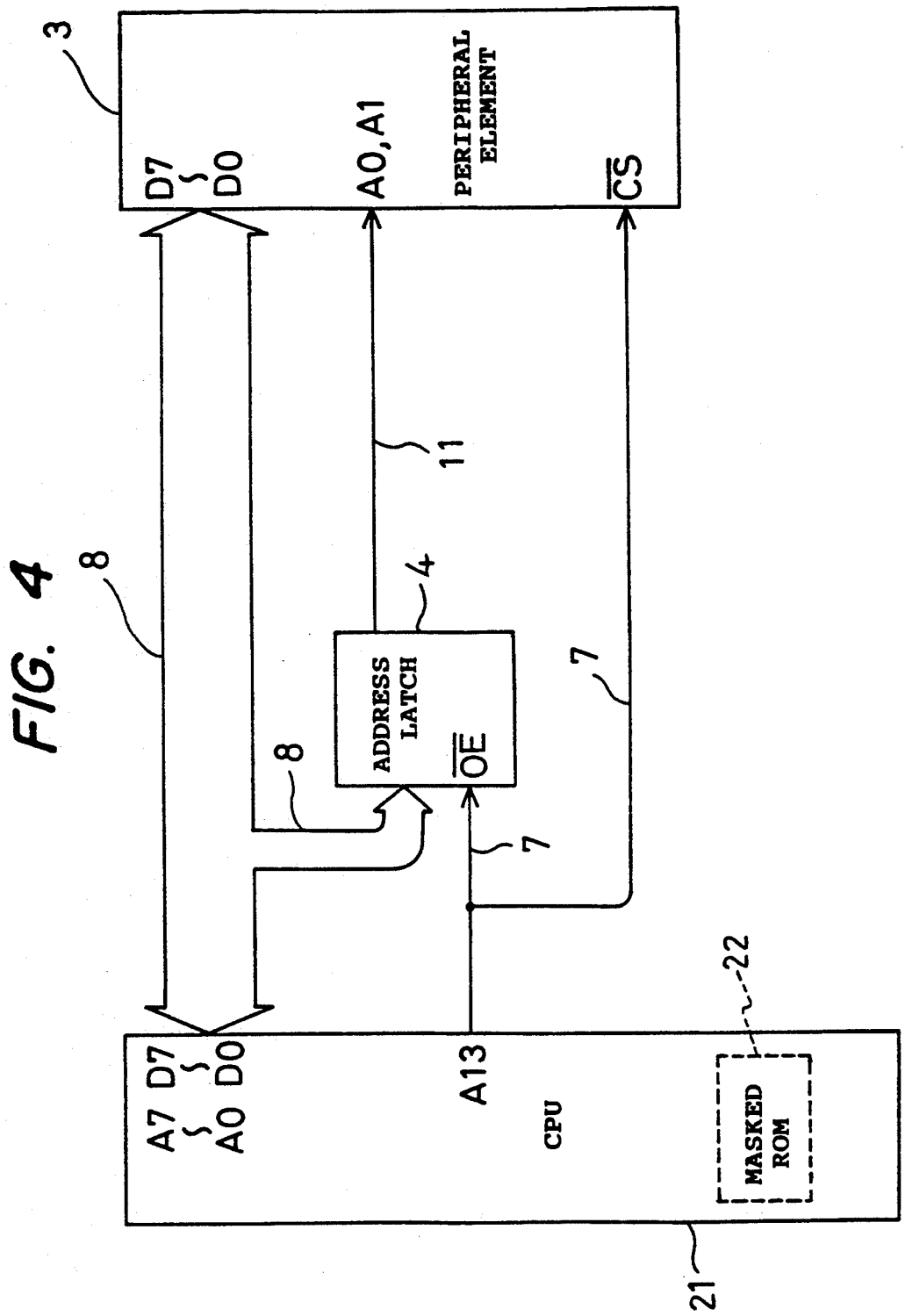
FIG. 4 is a block diagram showing a digital electronic circuit device which has an external ROM removed from the digital electronic circuit device shown in FIG. 3.

In a digital electronic circuit device shown in FIG. 2, the CPU 51, like the CPU 31, is provided with multiplexed address/data terminals A0~A7, D0~D7, and two groups of exclusive address terminals, A8~A12 and A13. Like the circuit device shown in FIG. 1, the multiplexed address/data bus 38 connects the multiplexed address/data terminals A0~A7, D0~D7 of the CPU 51 with the data terminals D0~D7 of the expansion port 33. The address bus 35 connects two terminals A8, A9 of the address terminals A8~A12 of the CPU 51 with the exclusive address terminals A0, A1 of the expansion port 33. The address bus 37 connects the address terminal A13 of the CPU 51 with the chip-select terminal CS the expansion port 33.

The CPU 51 has the multiplexed address/data terminals A0~A7, D0~D7. However, it outputs no address signal to the multiplexed address/data bus 38, through the multiplexed address/data terminals A0~A7, D0~D7, because the masked ROM 52 is inside the CPU 51. The other operations of the CPU 51 for controlling the expansion port 33 are similar to that of the CPU 31.

In the foregoing embodiment, the address bus 35 connects two terminals A8, A9 of the address terminals A8~A12 of the CPU 31 or the CPU 51 with the address terminals A0, A1 of the expansion port 33. Alternatively, the address bus 35 may connect the address terminals A0, A1 with any terminals of the CPU 31 or the CPU 51 other than the multiplexed address/data terminals A0~A7, D0~D7.

It should be understood that the present invention is not limited to the above description, but is subject to modifications, alterations and equivalent arrangements within the scope of the appended claims. Thus, while only certain embodiments of the invention have been specifically described herein, it will be apparent from the above teachings that numerous modifications may be made thereto without departing from the spirit and scope of the invention.

What is claimed is:

1. A digital electronic circuit device comprising:
   central processing means having plural terminals including a multiplexed address/data terminal capable of outputting an address signal and a data signal in a time-sharing manner, an exclusive address terminal for addressing a one of a plurality of ports of a peripheral device, and an internal memory means for storing required data, said required data comprising a complete program, for said central processing means, wherein there is no requirement to output an address signal through said multiplexed address/data terminal;
   peripheral means for receiving at least one of said address signal and data signal from said central processing means, said peripheral means having a data terminal and an input terminal, an operational state of said peripheral means being changed in response to a signal inputted through said input terminal;
   first means for connecting said multiplexed terminal with said data terminal; and
   second means for connecting said input terminal with a terminal of said plural terminals of said central processing means other than said multiplexed terminal.

2. A digital electronic circuit device according to claim 1, wherein said central processing means has an address terminal for exclusively outputting an address signal, and said second means connects said input terminal of said peripheral means with said address terminal of said central processing means.

3. A digital electronic circuit device according to claim 1, wherein said peripheral means has plural ports one of which is selected in response to a signal inputted through said input terminal.

4. A digital electronic circuit device according to claim 1, further comprising:
   address latch means connected with said first means for temporarily storing an address signal supplied from said multiplexed terminal through said first means;
   external memory means, connected with said first means and addressed by said address signal stored in said address latch means, for supplying a data signal to said first means; and
   said address latch being responsive to an enabling signal output by said central processing means, said enabling signal also being input to a chip select terminal of said peripheral means.

5. A digital electronic circuit device according to claim 4, wherein said external memory means is detachably connected with both said address latch means and said first means by connector means.

6. A digital electronic circuit device comprising:
   a central processing means having plural terminal portions including a multiplexed address/data terminal portion capable of outputting and receiving address signals and data signals in a time-sharing manner and an output terminal portion provided independently of said multiplexed terminal portion wherein said output terminal portion is an address terminal for exclusively outputting address signals to at least one of a plurality of ports of a peripheral device in accordance with a complete program having required data for said central processing means, said complete program being stored in an internal memory means;
   peripheral means for receiving at least one of said address signals and data signals from said central processing means, said peripheral means having a data terminal portion and an input terminal portion, an operational state of said peripheral means being selected among plural predetermined states in response to signals inputted through said input terminal portion;
   first signal transferring means for connecting said multiplexed terminal portion to said data terminal portion; and
   second signal transferring means for connecting said output terminal portion to said input terminal portion.

7. A digital electronic circuit device comprising:
   a central processing means having a mulitplexed address/data terminal portion, an address terminal portion, said multiplexed address/data terminal portion being capable of outputting and receiving address signals and data signals in a time-sharing manner, said address terminal portion exclusively outputting address signals to at least one of a plurality of ports of a peripheral device, and an internal memory means for storing required data, said required data comprising a complete program for said central processing unit, wherein there is no requirement to output an address signal through said multiplexed address data terminal;
   a peripheral element for receiving at least one of said address signals and data signals from said central processing unit, said peripheral element having a data terminal portion, an input terminal portion and plural input/output ports, one of said plural input/output ports being selected in response to signals inputted through said input terminal portion;
   a multiplexed address/data bus for connecting said multiplexed address/data terminal portion with said data terminal portion; and
   an address bus for connecting said address terminal portion with said input terminal portion.

8. A digital electronic circuit device according to claim 7, further comprising:
   an address latch connected with said multiplexed address/data bus for temporarily storing address signals supplied through said multiplexed address/data bus;
   an external memory addressed by said address signals stored in said address latch, said external memory being connected with said multiplexed address/data bus for supplying data signals to said central processing unit through said multiplexed address/data bus; and
   said address latch being responsive to an enabling signal output by said central processing means, said enabling signal also being input to a chip select terminal of said peripheral means.

9. A digital electronic circuit device according to claim 8, wherein said external memory is detachably connected with both said multiplexed address/data bus and said address latch by a connector.

10. A digital electronic circuit device comprising:
    central processing means having plural terminals including a multiplexed address/data terminal capable of outputting and receiving an address signal and a data signal in a time-sharing manner wherein at least one of said plural terminals is an address terminal provided independently of said multiplexed terminal for exclusively outputting an address signal to at least one of a plurality of ports of a peripheral device;

peripheral means for receiving at least one of said address signal and data signal from said central processing means, said peripheral means having a data terminal and an input terminal, an operational state of said peripheral means being changed in response to a signal inputted through said input terminal;

first means for connecting said multiplexed terminal with said data terminal;

address latch means connected with said first means for receiving an address signal from said multiplexed terminal through said first means;

external memory means connected with said first means for supplying a data signal to said central processing means, said external memory being addressed by said address signal stored in said address latch means; and second means for connecting said input terminal with a terminal of said plural terminals of said central processing means other than said multiplexed terminals.

11. A digital electronic circuit device according to claim 10, wherein said second means connects said input terminal of said peripheral means with said address terminal.

12. A digital electronic circuit device according to claim 10, wherein said external memory means is detachably connected with both said first means and said address latch by connector means.

* * * * *